Figure 1:
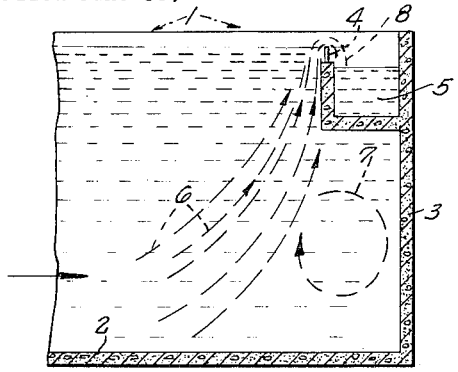

Dec. 7, 1965  A. A. HIRSCH  3,221,889
EFFLUENT REMOVAL STRUCTURE FOR SETTLING TANKS AND RESERVOIRS
Filed June 13, 1962  4 Sheets-Sheet 1

INVENTOR
a. adler Hirsch

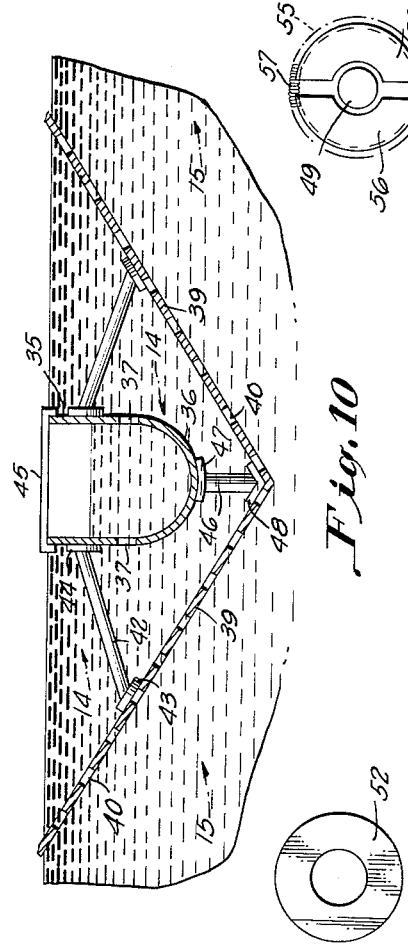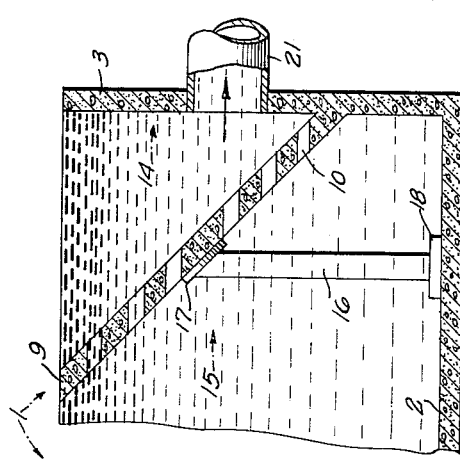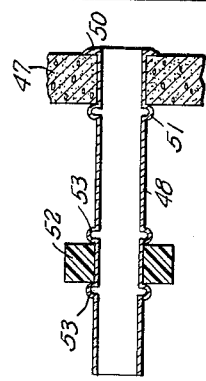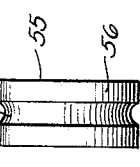

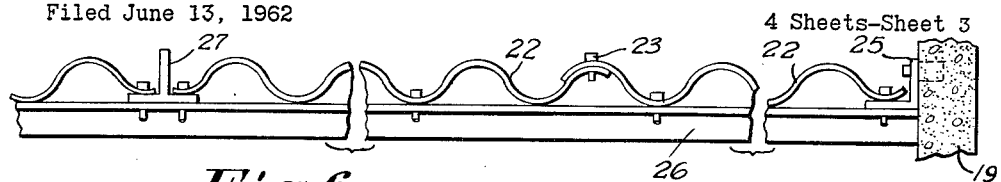
Fig. 6
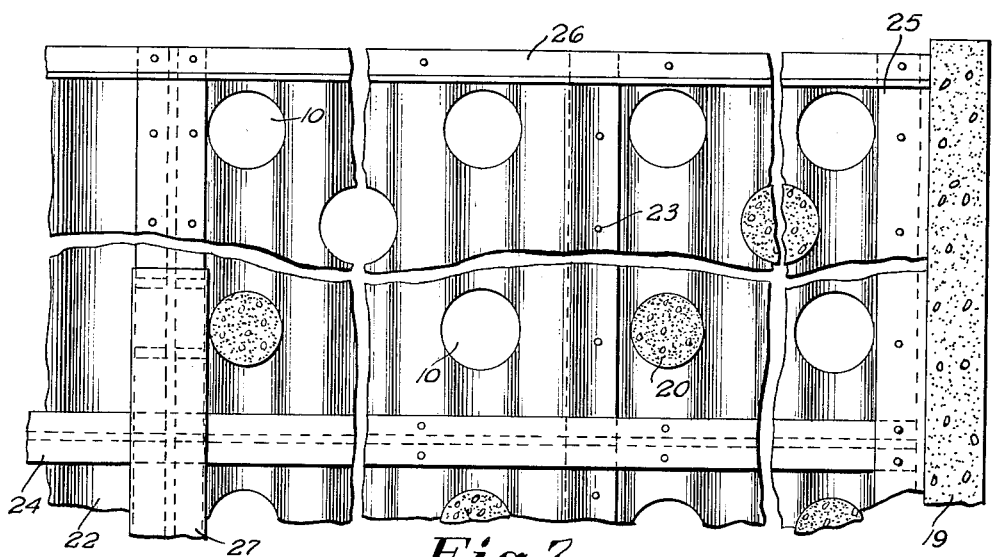
Fig. 7
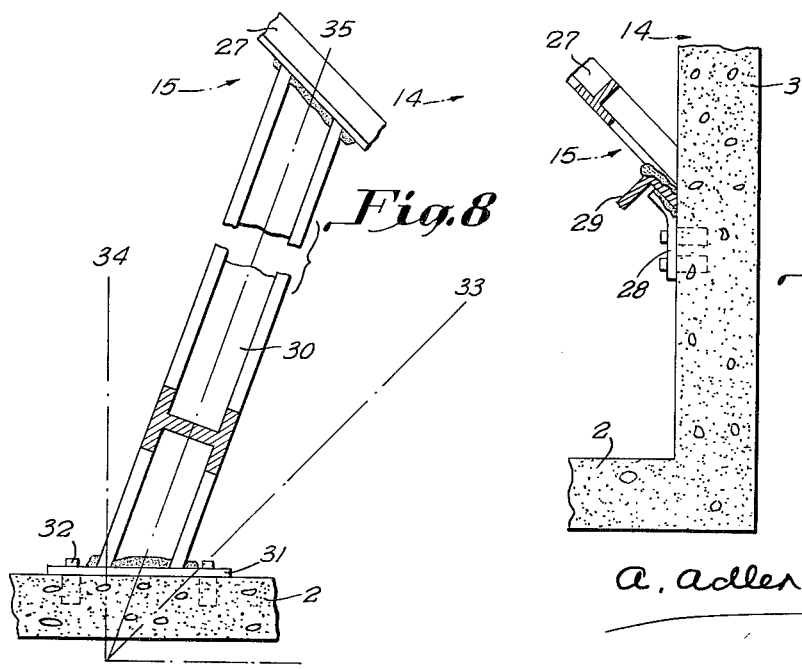
Fig. 8
Fig. 9
INVENTOR
A. Adler Hirsch

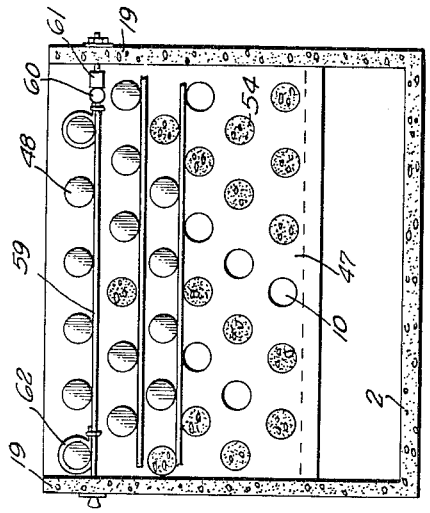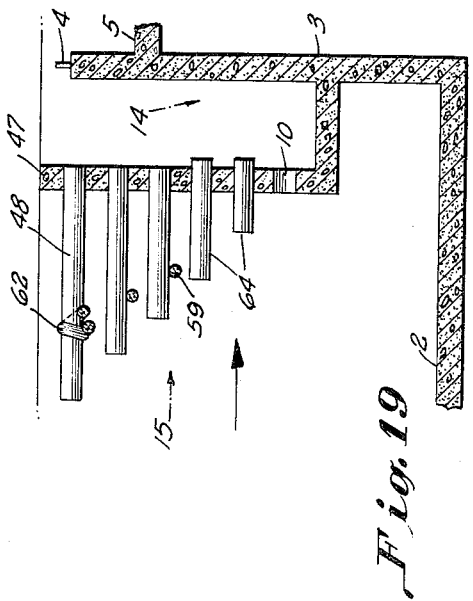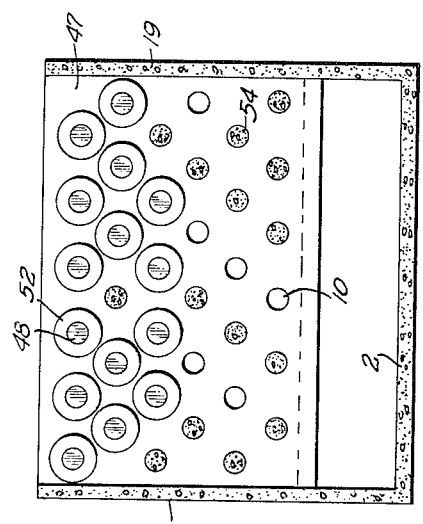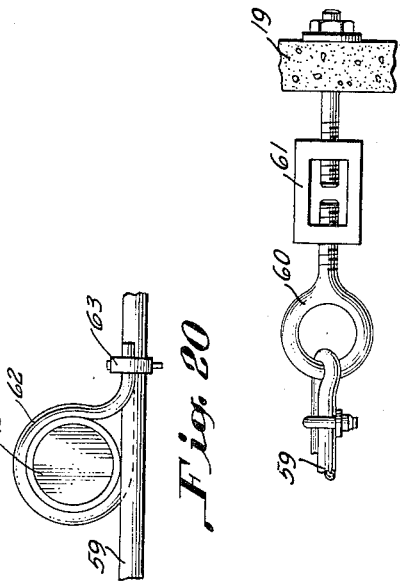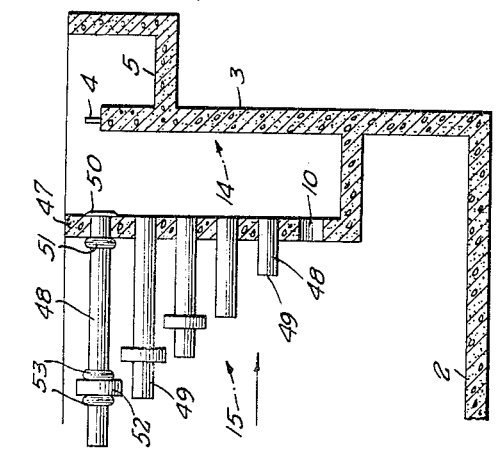

United States Patent Office

3,221,889
Patented Dec. 7, 1965

3,221,889
EFFLUENT REMOVAL STRUCTURE FOR SETTLING TANKS AND RESERVOIRS
Abraham Adler Hirsch, 141 Norwood St.,
Shreveport, La.
Filed June 13, 1962, Ser. No. 202,268
8 Claims. (Cl. 210—532)

My invention consists of an improved means for drawing off the effluent from a settling tank or reservoir, such as used in water treatment plants, sewage and waste disposal plants, and chemical process plants, so as to avoid or minimize the carryover of flocculated solids or other suspended materials in the effluent liquid stream.

A virtually universal shortcoming of settling tanks, especially those used in a continuous process, is that at the exit end the liquid stream near the collection devices nearly always carries along more or less suspended material which rises from the bottom portion of the tank in a chimney upsweep fashion. In fact, the streamlines converging toward the terminal opening of a conventional coagulation reservoir in a water treatment plant can usually be traced by noting the path followed by the floc as it funnels toward the outlet. A similar pronounced effect is noted in the final settling tanks of sewage treatment plants employing the activated sludge process.

This phenomenon places a physical limitation on the capacity of a settling tank. If an upper limiting rate of flow is exceeded in a water plant the sediment content of the effluent depreciates its quality and throws an additional burden on the filters. The net result is that filter runs are shortened and the wash water consumption is increased. In plants using alum as a coagulant a part of the floc in the effluent is redissolved when lime or soda ash is added for pH control and some, not deposited in the filter sand, passes on to the distribution system where it again may precipitate in the pipelines.

Appreciation of the importance of the upsweep phenomenon has evoked several types of remedial efforts. Special draw off arrangements for this purpose include use of such devices as a perforated vertical wall ahead of the effluent opening, advancement of final weir placement toward the influent end of a settling tank, removal of effluent through a plurality of skimming weirs or orifice gutters at the top of the tank, and sloping the floor construction in conjunction with multiple skimmer weirs over much of the surface of the tank.

While some partial degree of success has attended each of these devices, the upsweep effect still remains. Furthermore, some of these constructions complicate the tank and increase initial investment cost considerably. The tapered floor approach deprives the reservoir of much of its volume and hence it becomes susceptible to vagaries of eddy currents and short circuits. Also unless continuous sludge removal has been installed the mud storage volume becomes filled sooner than in a conventional flat bottom tank.

Admittedly the most important single step in the treatment of surface waters is that of coagulation, since this action makes many raw waters amenable to filtration so as to produce a clear and bacterially-acceptable end product. Considering the importance of coagulation and its concomitant stage of settling, the need for an effective hydraulically-based means for elimination or significant reduction of carryover is readily evident.

The principal object of subject invention is to recognize the hydraulic characteristics of liquid flow in the vicinity of a reservoir outlet and to apply this behavior to the construction of a distributive baffle which trains the currents to reduce their vertical components at the exit end of a basin. To accomplish this purpose an oblique orifice wall, having specially spaced openings, sloping against the direction of flow, is interposed before the outlet collection means. This wall spreads out the chimney upsweep currents over a relatively large area, instead of permitting their concentration at the outlet, as in heretofore existing basins. As a result, the vertical currents which tend to lift floc and other suspended matter from the floor of the tank are so diminished that settleable material can no longer be carried in suspension. The effluent can then approach complete clarity.

A second object of this invention is to demonstrate a device that will minimize carryover when the basin is extended to higher flow rates unattainable satisfactorily without this provision. By adoption of this device, plants already built may extend their productive capacities considerably.

The resolution of alum floc on alkanizing for pH ocntrol has already been pointed out. This may cause turbidity in pipelines and in consumers vessels. Hence a further object of my invention is to provide turbidity-proof finished water by elimination of the floc which would be dissolved by liming and later released from solution in the distribution network and in consumers containers.

In activated sludge sewage treatment plants the carryover of floc from the final settling tank and into the effluent adds organic material in suspension which appears as B.O.D. This escaping activated sludge also represents a loss of gas forming solids which should be pumped to the digestors. Such sludge in the discharge will also promote the growth of worms and related organisms in the effluent ditch.

In waste treatment plants the loss of solids in the effluent stream reduces its quality and lessens the degree of nuisance abatement. In chemical process plants the carryover of unwanted solids entails obvious economic losses.

Another further object of my invention is to provide a means to draw settled water selectively from various depths in a basin, and at various distances horizontally and vertically from the final draw off opening, so as to equalize the rate of flow throughout the cross section of the basin and preserve this uniformity of distribution up to the point of selective draw off. This is accomplished by adjusting the orifice pattern in the draw off baffle in a manner determined experimentally after installation. A good, hydraulically rational arrangement at the inlet is conducive to best results at the outlet of a basin.

A further object of my innovation is to present a device for reduction in amount of suspended solids carryover that is applicable with substantially the same effectiveness at the effluent end of an upflow tank as with the older conventional basins. This is accomplished by guiding the flow lines to the effluent weirs or other devices, whether placed peripherally, concentrically or radially at the surface of the tank, by means of inclined baffle plates. The vertical component of the flow is made practically uniform throughout a horizontal cross section in the upper portions of the tank; the horizontal component, in advance of the inclined orifice baffle plates, is essentially eliminated.

Another adaptation of my device is to afford improvement in effluent clarity in those basins already provided with a system of H-weir draw off. An inclined orifice baffle or oblique perforated skirt is suspended along each individual weir gutter to prevent the concentration of flow lines close to the crests.

A further object of my invention is to apply the advantages of the principle of non-convergent effluent streamlining to existing conventional basins that already have some type of currently known effluent training structure. In the case of vertical orifice walls this is done by inserting tubes of various lengths, according to their height in the tank, so that the forward openings lie in an inclined surface analogous to the position of an inclined orifice baffle wall.

Figure 2:
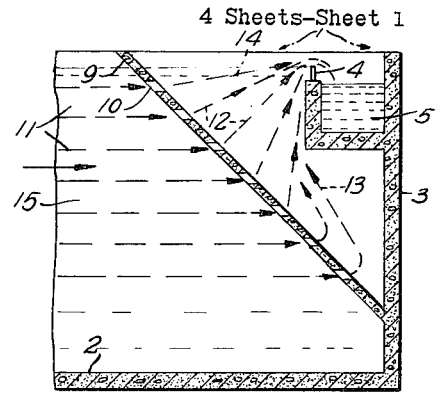
Figure 3:
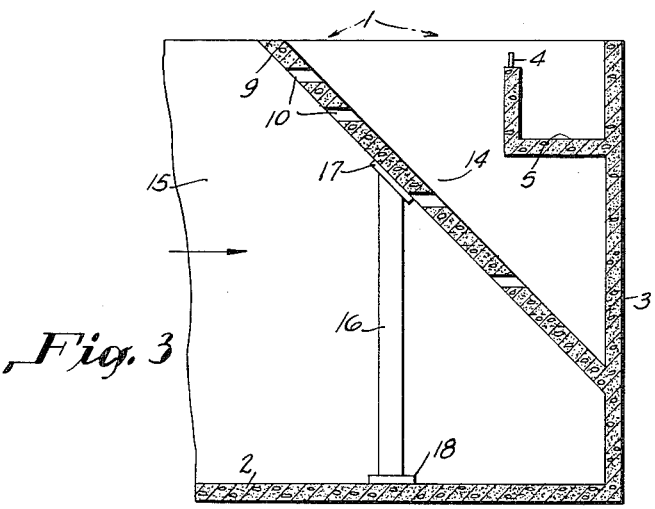
Figure 4:
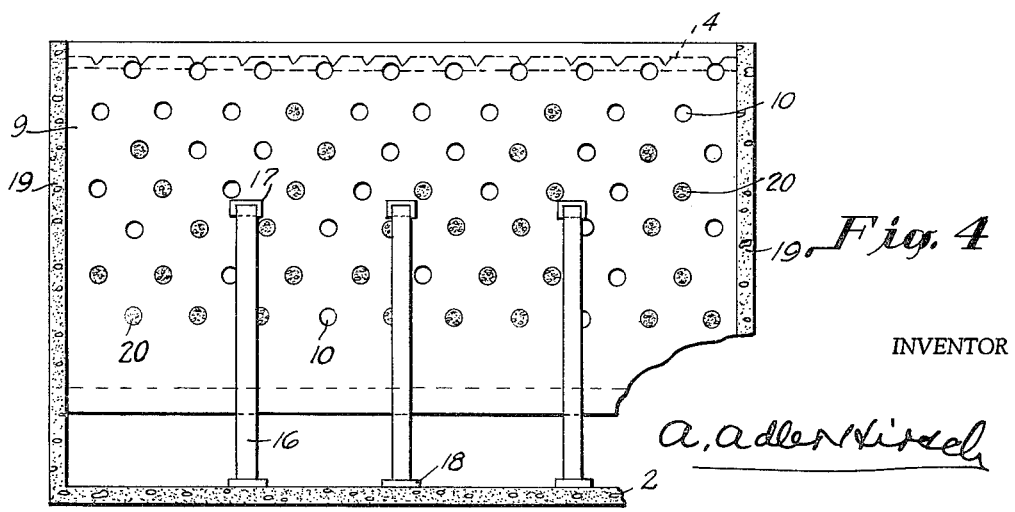

The details of my effluent draw off inclined orifice baffle are shown in the following drawings in which:

FIGURE 1 is a schematic cross section of the terminus of a basin to illustrate the concentration of flow lines from its bottom toward the collection device, FIGURE 2 is a schematic cross section of the effluent end of a basin equipped with an inclined orifice wall to illustrate its guiding effect in keeping the flow back in the basin practically horizontal and confining the upward currents within the enclosure formed by the diagonally disposed wall wherein no sludge can be lifted, FIGURE 3 is a cross section of a typical inclined orifice wall at the effluent end of a settling basin having a weir and collection trough, FIGURE 4 is a front elevation of the above inclined orifice wall showing the selective plugging of ports to control currents therethrough, FIGURE 5 is a vertical cross section of the draw off end of a conventional settling basin from which effluent is withdrawn without a distributive gathering means other than that provided by the inclined orifice wall, FIGURE 6 is a top view of the top edge of an inclined orifice wall constructed of light weight material on metal framework, FIGURE 7 is a partial front view of the inclined orifice wall of FIGURE 6 to show the pattern of the open and the plugged orifices and some details of the framing, FIGURE 8 is an elevation to show typical detail of the outboard columns used for supporting the inclined orifice wall of FIGURE 6, FIGURE 9 is an elevation of the inclined orifice wall of FIGURE 6 to show construction of its joint with the rear wall of the basin, FIGURE 10 is a transverse cross section showing the application of an inclined orifice baffle to a weir gutter which may be either of the longitudinal H-type in a conventional basin, or a radial or a circularly disposed weir in an upflow basin, FIGURE 11 is a plan view of a portion of the inclined orifice baffle shown in FIGURE 10, FIGURE 12 is a cross section of an adaptation of the inclined orifice wall draw off principle to an existing vertical orifice wall by means of variable length draw off tubes or ducts protruding through the orifices into the basin, FIGURE 13 is a front elevation of the structure of FIGURE 12 to show the selective plugging of existing orifices which are not desirable for insertion of draw off tubes, FIGURE 14 is an elevation of the annular float which helps to support the protruding tubes, FIGURE 15 is a cross section of a draw off tube in position showing a means of attaching the float of FIGURE 11, FIGURE 16 shows the front elevation of an alternative form of float, FIGURE 17 shows the edge or face elevation of the float of FIGURE 16, FIGURE 18 is a front elevation of an alternate construction of the variable length tubular type draw off wall in which support of the tubes is provided by a set of cables strung between the side walls of the basin, FIGURE 19 is a cross section at the end of a basin to show further features of the system of support of FIGURE 18, FIGURE 20 shows in elevation a means for attaching draw off tubes to a supporting cable, and FIGURE 21 shows in elevation a means for fastening the supporting cable to the side walls of the reservoir.

In all views a given numeral refers to the same structural element.

Referring to specific drawings:

FIGURE 1 shows typical conditions at the terminal end 1 of a conventional settling basin having a floor 2, an end wall 3, a draw off weir plate 4 and an effluent trough 5 whence settled water flows to the filters. Streamlines 6 show the regularly observed chimney upsweep effect, especially at high rates of flow. This action arises from the acceleration caused by sudden change in direction of flow as the current is blocked by the end wall. The bottommost flow line 7 eddies underneath the weir trough. By keeping the suspended matter in circular motion it interferes seriously with the clarity of the effluent 8.

Practically no flow lines exist at the surface of the water only a relatively short distance ahead of the weir, indicating a quiescent zone, but one that has been unavailable heretofore for productive yield. Further toward the inlet of a typical basin the turbidity of the supernatant liquid is strikingly less than that in the vicinity of the upswept stream toward the weir plate.

In FIGURE 2 conditions in the same basin are shown after interposing an inclined perforated septum, in this example an orifice wall 9 which acts as a protective partition ahead of the final weir 4. Wall 9 is inclined against the direction of flow in the basin, and contains a plurality of distributed orifices 10. These in effect permit the water to ascend in a broad band toward the effluent weir instead of being concentrated in the narrow streamline sheets 6. By keeping the streamlines 11 practically horizontal ahead of the orifice wall, eddy currents are avoided where they otherwise would cause detrimental churning.

On the weir side of the inclined orifice wall the streamlines 12 converge directly toward the weir. Any tendency toward eddying, as indicated by curvature in the lowest flowline 13 now becomes inconsequential since only clear liquid is contained in the zone 14 to the rear of the inclined orifice wall. In this way the effluent is considerably clearer and freer of carryover when the basin is provided with the guiding action of an inclined orifice wall.

Experiments on a model tank with an orifice wall of variable inclination have confirmed the descriptive theory stated above.

As will be noted in the following descriptions the perforated septum, which provides parallel alignment of the current within the nominally quiescent settling zone of the tank, may assume several forms. In any case, however, it abruptly divides the tank at its exit end 1 into the last portion of the settling volume 15 and the effluent draw off zone 14. Once the liquid has passed through this septum the convergence of stream lines and turbulence immediately before the draw off means are innocuous so far as degradation of the quality of the effluent is concerned. This is true because the chimney upsweep effect which originates in the mud zone at the bottom of the settling portion of the tank is avoided.

FIGURE 3 shows a structure in which the principles of tapered final withdrawal, illustrated in FIGURE 2, is applied. In this cross section of the terminal end 1 of the settling basin the rear wall 3, and other walls are shown for example as all concrete construction but any other acceptable structural material will do. This rear wall furnishes support for the bottom of the inclined orifice wall 9. The juncture of walls 9 and 3 is sufficiently high above the floor of the basin to permit deposition and accumulation of sludge, or to allow for passage of a raking mechanism. Pillars 16 spaced along the length of the wall support the span protruding back into the basin. Top cap 17 and bottom cap 18 transfer the load at the ends of the column.

The elevation FIGURE 4 illustrates the widespread coverage of the orifices 10 over the surface of the inclined wall 9 between its ends at the side walls 19. For purpose of order and regularity, orifices are arranged in a series of rows or tiers with holes staggered in intervening rows. After installation some of the orifices are plugged 20, based on observations during actual operation. Preforming an excess of holes 10 and later plugging them shut 20 is preferable to attempting to forecast specific location of functionally operative holes.

The effectiveness of the inclined orifice wall in training the terminal currents in the settling zone of a basin is shown in FIGURE 5. This basin resembles the one in FIGURE 3 except that all heretofore used collection distributive devices have been omitted. The effluent flows directly out of the basin through conduit 21. This condition represents an extreme case for the confluence of streamlines and the carryover of floc. Interposition of the inclined orifice wall 9, with a suitable plugging pattern of the orifice field, will correct this defect. Thus with an inclined orifice wall an extensive collection means, such as a weir running the full width of a basin, becomes functionally unnecessary and may be dispensed with when planning a basin.

In FIGURES 6, 7, 8 and 9 construction of the inclined orifice wall is shown using corrugated, fiber reinforced plastic sheets 22 for the sake of lightness. Orifices 10 are punched in the sheets of structural plastic in the same pattern as illustrated in FIGURE 4 and plugged 20 as experience indicates to produce the clearest effluent.

These sheets are joined together with bolts 23 to form a panel over supporting structural members: horizontal T's 24 in the span of the inclined wall, angles 25 at the side walls, and angles 26 strung horizontally between wall angles 25 and vertical T's 27 at the margins of the panel. Support at the bottom of the inclined plastic sheeting panels is furnished by clip angles 28 spaced intermittently and fastened to rear wall 3 of the basin. Angle 29 runs along the bottom of the plastic sheeting panels to carry the load between the clip angles. Vertical support within the basin is provided by inclined I-beams 30 which are welded at the top to a T 27. Columns 30 are welded to base plates 31 which are fastened to the floor of the basin by means of expansion bolts 32. For structural reasons the columns 30 are best located at a distance from the joint at the end equal to ⅔ the inclined length of the orifice wall. Columns 30 are inclined to receive most of the thrust of the inclined orifice wall axially. The normal from the toe of the column to the inclined orifice wall lies along line 33. Line 34 is the vertical. Column 30 is inclined so that its axis 35 lies midway between this vertical line and the normal 33.

FIGURES 10 and 11 illustrate the application of the inclined orifice wall draw off principle to a weir trough 35 which extends over the surface of a basin or tank. This weir may be either an H-type spread over the rear portion of a conventional settling basin, or a radial or a concentrically circular weir of an upflow tank. A similar construction would hold if the gutter 36 collected effluent through submerged orifices 37 instead of by overflow at the top edge 38. The inclined perforated guide 39 now being on both sides of the collection gutter may be termed a winged orifice baffle. Effluent is gathered from the basin through a set of orifices 40 located in orderly fashion over the surface of the baffle. Some of these orifices are plugged 41, based on observations of the device during use. The winged baffle is stiffened by ties 42 which terminate in plates 43 and 44 fastened to the baffle and to sides of the gutter, respectively. A series of ties 45 across the top of the gutter keep it from spreading.

The vertical load is held by ties 46 which join the bottom of the perforated wing baffle to the bottom of the trough. These rods 46 terminate in plates 47 and 48 which are contoured to fit the curvature at the bottom of the trough and the angle between the baffle plates, respectively, where they are fastened.

Adaptation of the inclined ported septum principle to an existing vertical orifice wall 47 is shown in FIGURES 12 to 21. Various lengths of draw off tubes 48 are used. Their outboard ends 49 extend into the basin a distance dependent on their height above the floor of the basin in such a manner as to taper off the velocity of the liquid which would otherwise impinge directly against the original orifice wall 47.

In FIGURE 12 the tubes are shown attached to the vertical orifice wall by means of a flare 50 on the inboard side and an expanded roll 51 on the outboard side. Any equivalent means to prevent axial movement of the tubes will suffice.

The cantilevered weight of the longer tubes, those toward the surface of the water in the basin, is relieved by the buoyancy of float collars 52 which are shown fastened in position also by means of rolled in beads 53. Again, any other effective means for anchoring the floats will be satisfactory. In order to provide greatest rigidity the floats 52 are set a distance of ⅔ the length of the tube 48 into the basin.

As shown in FIGURE 13 some of the holes in the original vertical orifice wall 47 carry draw off tubes 48; the remaining holes are plugged 54. This is done conveniently by driving in wooden pegs or filling the holes with concrete. The exact distribution of tubes and plugged orifices is best determined by field trial in any particular basin.

As indicated in FIGURES 14 and 15 the float collar 52 is an annulus of lightweight waterproof material, such as foamed plastic, cork, or the like. These are slipped on the draw off tubes before the basin-side roll of beads 53 is formed.

FIGURES 16 and 17 show a modification 55 of a float made by clamping annular halves 56 of lightweight buoyant material together across the circumference of a draw off tube 48 by means of a spiral spring 57 which seats in circumferential groove 58.

If sufficient rigidity is developed within the insertion between the draw off tubes and the vertical orifice wall, and the wall is thick enough to provide an adequate supporting moment, the floats may be eliminated. When the draw off tubes are composed of plastic materials this is particularly true if the basin or tank is located indoors where the tubes will not be softened by hot summer sunshine. Otherwise some method is necessary to support the weight of the draw off tubes whenever the basin is drained.

Another type of construction to support the outboard ends of the draw off tubes is shown in FIGURES 18 to 21. The span of the tubes in the upper tiers rest on cables 59 which are strung between eyebolts 60 fastened to the walls 19 of the basin. Turnbuckles 61 adjust the tension in the cables to prevent excessive sag. The draw off tubes are fastened to the supporting cables by means of a single closed loop of wire 62 fastened to the support cable by means of a clip 63 as shown in FIGURE 20. In this type of construction there is no need to fasten the draw off tubes into the vertical orifice wall as the cable clip fixation will prevent longitudinal slippage. In FIGURE 19 the lower tiers 64 of draw off tubes are shown extending a slight distance inboard in order to obviate fastening to the orifice wall.

Drainage of sludge and liquid inside the rear of the inclined orifice baffle for cleaning is provided through the lowest row of unplugged orifices. Should a condition develop wherein a low level of unplugged holes is undesirable drainage can be obtained by unplugging several such holes temporarily or by installing a familiar mud valve at the bottom of the enclosure.

Leak proofness in construction of this device is unnecessary as any leakage inflow across the various joints of the inclined orifice wall is inconsequential compared to the normal flow through the ports.

Other types of fastenings for draw off tubes will be apparent and come within the scope of this specification. Other arrangements of ported walls also will be obvious and are included as within the coverage of this application.

Although the drawings show the basinward front of the various ports as lying in a plane, curvature of this front, either simple or warped, can accomplish similar results, especially with selective plugging as required in individual cases, and come under the scope of this application.

In determining the angle which the inclined orifice wall or basin front of the ports make with the vertical, the greater this inclination the more effective is the training action in eliminating the chimney upsweep effect. Although any inclination shows an advantage, a minimum of 45° is advisable; a further reach back into the basin with 60° inclination is recommended. Further inclination, while desirable hydraulically, pose structural complications without further incremental benefit sufficient to justify same in the usual conventional basin.

I claim:

1. The combination in a settling tank for removing suspended solids from liquids contained therein having means to maintain a surface therein comprising an effluent removal means, an effluent baffle means disposed in said tank in advance of and in proximity to said removal means, said baffle means separating said tank into a settling first zone and a second zone which is adjacent said removal means; said baffle means extending from slightly above the surface of said liquid to above the level of solids settled in said tank, said baffle means including a plurality of port means through which said liquid passes from said first zone to said second zone; said port means having openings lying in an inclined surface, said openings disposed at progressively increasing horizontal distances from said removal means as said openings approach the surface of said liquid; some of said port means having plug means to prevent liquid flow through said some port means for adjusting flow of said liquid through said first zone to form flow currents which are substantially parallel to each other as said currents approach said baffle means.

2. The combination of claim 1, wherein said baffle means is inclined and abuts an end wall of said tank above the level of the settled solids and extends upwardly to the same height as side walls of said tank, said port means consisting of openings disposed in a pattern on the surficial area of said baffle means.

3. The combination of claim 2, wherein said tank and said baffle means include column means to support said baffle means in its inclined disposition.

4. The combination of claim 2, wherein the horizontal distance between said baffle means and said end wall progressively increases as said baffle means approaches the surface of said liquid.

5. The combination of claim 1, wherein said baffle means is inclined and said effluent removal means is disposed adjacent a top periphery of said tank.

6. The combination of claim 1, wherein said effluent removal means consists of a plurality of effluent troughs spread over the surface of said liquid; said effluent baffle means consisting of inclined plates parallel to said effluent troughs and intersecting each other along a line below the bottom of each of said effluent troughs; said plates extending from said line to the height of side walls of said tank, tie means attaching said plates to said effluent troughs for supporting said baffle means about said effluent troughs; said port means having said openings disposed in a pattern on the surficial area of said plates.

7. The combination of claim 6, wherein said plates are inclined against the horizontal component of said flow current and the intersecting plates form a V-shaped baffle means beneath said effluent troughs; said plates including further tie means to attach said plates to the bottom of said effluent troughs.

8. The combination of claim 1, wherein said baffle means is vertical and includes a plurality of orifices, tube means having an end of each inserted in at least some of said orifices and said tube means extending therefrom into said first zone, said tube means varying in length with said length increasing from the bottom to the top of said baffle means, the ends of said tube means opposite their inserted ends forming said port means, said tube means communicating said first zone with said second zone, means for supporting the longer of said tube means to prevent endwise deflection of said tube means, said some port means including said orifices disposed above the lowermost of said tube means and at least some of said orifices below the lowermost of said tube means.

References Cited by the Examiner

UNITED STATES PATENTS

| | | | |
|---|---|---|---|
| 1,705,009 | 3/1929 | Fuqua | 210—247 X |
| 2,891,008 | 6/1959 | Weston et al. | 210—532 X |
| 3,015,396 | 1/1962 | Quast | 210—221 |
| 3,048,275 | 8/1962 | Headrick | 210—247 |

REUBEN FRIEDMAN, *Primary Examiner.*

HERBERT L. MARTIN, *Examiner.*

D. M. RIESS, R. A. CATALPA, *Assistant Examiners.*